United States Patent
Franz et al.

(10) Patent No.: US 7,117,488 B1
(45) Date of Patent: Oct. 3, 2006

(54) SAFE COMPUTER CODE FORMATS AND METHODS FOR GENERATING SAFE COMPUTER CODE

(75) Inventors: Michael Franz, Irvine, CA (US); Wolfram Amme, Jena (DE); Jeffrey Von Ronne, Irvine, CA (US)

(73) Assignee: The Regents of the University of California, Oakland, CA (US)

( * ) Notice: Subject to any disclaimer, the term of this patent is extended or adjusted under 35 U.S.C. 154(b) by 595 days.

(21) Appl. No.: 10/112,002

(22) Filed: Oct. 31, 2001

(51) Int. Cl.
*G06F 9/44* (2006.01)

(52) U.S. Cl. ........................ 717/144; 717/146
(58) Field of Classification Search ........ 717/140–148, 717/159; 713/194; 711/170–173
See application file for complete search history.

(56) References Cited

U.S. PATENT DOCUMENTS

| | | | |
|---|---|---|---|
| 5,530,866 A * | 6/1996 | Koblenz et al. | 717/144 |
| 5,659,753 A * | 8/1997 | Murphy et al. | 717/147 |
| 5,732,273 A * | 3/1998 | Srivastava et al. | 717/128 |
| 5,974,549 A | 10/1999 | Golan | |
| 6,021,273 A * | 2/2000 | Griesemer | 717/148 |
| 6,023,764 A | 2/2000 | Curtis | |
| 6,086,632 A * | 7/2000 | Hirotani | 717/146 |
| 6,128,774 A | 10/2000 | Necula et al. | |
| 6,131,165 A | 10/2000 | Lipkin et al. | |
| 6,151,618 A * | 11/2000 | Wahbe et al. | 718/1 |
| 6,272,612 B1 * | 8/2001 | Bordaz et al. | 711/203 |
| 6,279,111 B1 | 8/2001 | Jensenworth et al. | |
| 6,282,652 B1 | 8/2001 | Scheifler | |
| 6,629,312 B1 * | 9/2003 | Gupta | 717/136 |
| 6,779,114 B1 * | 8/2004 | Chow et al. | 713/189 |
| 6,851,108 B1 * | 2/2005 | Syme et al. | 717/146 |
| 2002/0026633 A1 * | 2/2002 | Koizumi et al. | 717/146 |

OTHER PUBLICATIONS

Michael Franz, *Code-Generation-On-The-Fly, A Key to Portable Software*, ETH Zurich, Mar. 1994.
Michael Franz, T. Kistler, *Slim Binaries* Communications of the ACM, Dec. 1997, pp. 87-94.
B.K. Rosen, N.M. Wegman, F.K. Zadeck, *Global Value Numbers and Redundant Computations* from Fifteenth Annual POPL Conference 1988.
*Architecture Neutral Distribution Format—X/Open Preliminary Specification*, X/Open Company Ltd., Jan. 1996.
Joseph Hummer, Ana Azevedo, David Kolson, and Alexandru Nicolau, *Annotating the Java Bytecodes in Support of Optimization*, Concurrency: Practice and Experience. Nov. 1997, vol. 9(11): 1003-1016.
T. Kistler, Michael Franz, *A Tree-Based Alternative to Java Byte-Codes*, International Journal of Parallel Programming, 27 (1):21-34, Feb. 1999.
Greg Morrisett, David Walker, Karl Crary, Neal Glew, *From System F to Typed Assembly Language* ACM Trans. Prog. Lang. And Sys. 23(3): 528-569, May 1999.
G.C. Necula, *Proof Carrying Code*. Symposium on Principles of Programming Languages, In POPL '97 Paris, France, Jan. 1997.

(Continued)

*Primary Examiner*—Kakali Chaki
*Assistant Examiner*—Jason Mitchell
(74) *Attorney, Agent, or Firm*—Orrick, Herrington & Sutcliffe LLP

(57) ABSTRACT

An inherently safe code format for representing computer programs is disclosed. The format provides incorruptible referential integrity and uses type separation to achieve intrinsic type safety. The format preserves a safety guarantee found in a source code language representation of the computer program while the computer program proceeds through various stages of the code compilation process.

9 Claims, 5 Drawing Sheets

OTHER PUBLICATIONS

K.V. Nori, U. Ammann, *Pascal—The Language and Its Implementation*, Editor D.W. Barron, John Wiley and Sons, Ltd., 1981, pp. 125-170.

Shao Zhong, *Typed Common Intermediate Format*, 1997 USENIX Conference on Domain-Specific Languages, 89-101.

Tim Lindholm, Frank Yellin, *The Java Virtual Machine Specification, Second Edition*, Addision Wesley, May 1999.

*Common Language Infrastructure (CLI) Partition III, CIL Instruction Set*, from http://msdn.microsoft.com/net/ecma/, 2001.

Wolfram Amme, Niall Dalton, Jeffery von Roone, Michael Franz, *SafeTSA: A Type Safe and Referentially Secure Mobile-Ciode Representation Based on Static Single Assignment Form*, 2001.

Dan Seth Wallach, *A New Approach to Mobile Code Security*, Jan. 1999, 1-171.

Wolfram Amme, Niall Dalton, Peter H. Frohlich, Vivek Haldar, Michael Franz, *Project TRANSPROSE: Reconciling Mobile-Code Security with Execution Efficiency* 1-15.

Andrew W. Appel, Edward W. Felten, Zhong Shao, *Scaling Proof-Carrying Code to Production Compilers and Security Policies*, Jan. 1999, 1-21.

Insik Shin, John C. Mitchell, *Java Bytecode Modification and Applet Security* 1-20.

\* cited by examiner

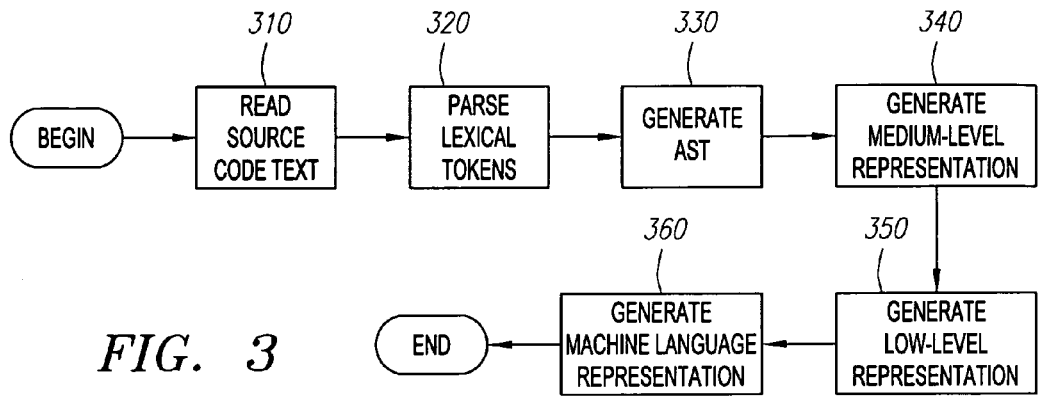
FIG. 3
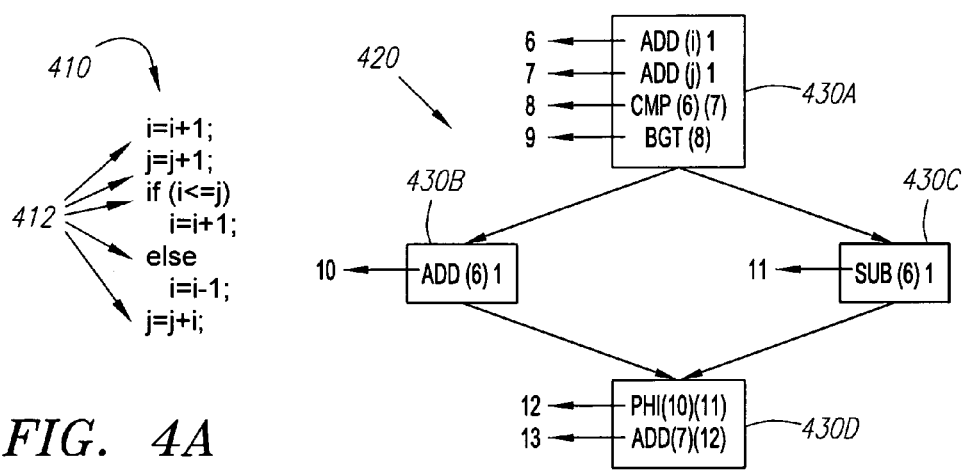
FIG. 4A
FIG. 4B
(PRIOR ART)
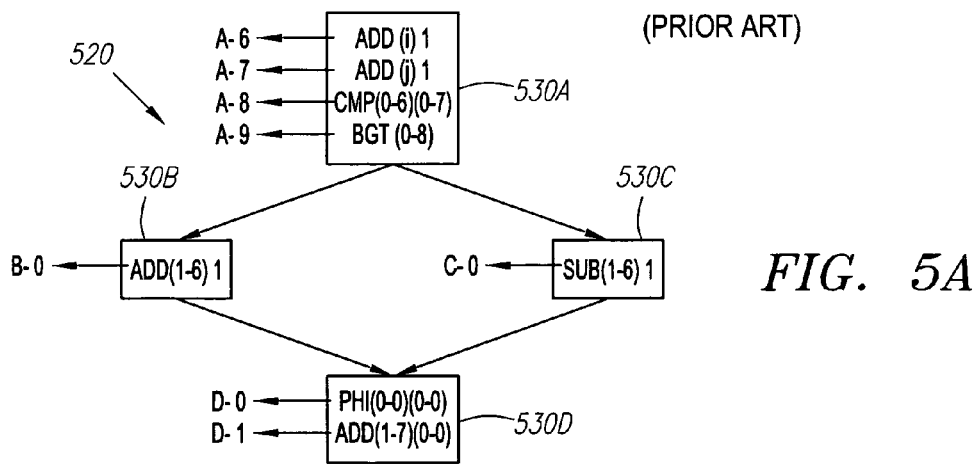
FIG. 5A

SAFE COMPUTER CODE FORMATS AND METHODS FOR GENERATING SAFE COMPUTER CODE

This invention was made with Government support under Grant No. F30602-99-1-0536, awarded by the DOD Advanced Research Projects Agency. The Government has certain rights in this invention.

FIELD OF THE INVENTION

The invention relates to the field of computer programming code formats, and more particularly to preventing execution of undesired computer code through use of safe computer code formats.

BACKGROUND

There is a trend in modern computing towards designing computer systems and computer code that is automatically verified prior to execution, to insure that the computer code is free from certain forms of coding errors, as well as that the computer code is not malicious in nature.

If an adversary succeeds in deceiving a user into executing malicious code, such as a virus or other undesired program, catastrophic consequences may result, including data theft, data destruction, and the like. Thus, it is important to develop methods that prevent malicious code from executing and causing harm to users and their data.

One means of preventing malicious code from executing is to shield the computer systems and the associated communications channels, peripherals, etc., using physical and logical access controls, such as locked doors to computer rooms, and password protected computer systems. Another means of preventing malicious code from executing is to use cryptographic authentication mechanisms to detect code that has not originated with a known and trusted code provider, or that has been tampered with. However, these means are not foolproof. If an intruder manages to penetrate the physical or logical security systems, and is able to present the computer system with malicious code that falsely authenticates itself as being uncompromised and originating from a trusted party, the malicious code will be allowed to execute, potentially causing great harm.

To provide a further line of defense, software developers have looked to means of securing the code itself, such that only non-malicious, "safe code" is allowed to execute. One means of securing the code involves inspecting and verifying that the code will not cause harm. The code is symbolically executed prior to being run. An analyzer follows the flow of all variables along all data paths in the program, and verifies that the code is "type safe." This verification process is very time-consuming, and causes significant delays in the execution of the code.

Type safe code is code that does not allow the type system or type rules present in the code format to be violated. For example, storing values of a particular type into a variable defined as a different type is not allowed in type safe code. In addition, array bounds are enforced in type safe code. Assume an array is declared as having ten elements. A malicious code provider might wish to access array element eleven, thereby circumventing the type rules and gaining access to whatever variable happened to be located at the memory location corresponding to element eleven of the array—even if that variable is marked as being private or protected. Many exploits of security holes use this route, using a breach of type safety to modify variables that they normally would not have access to. Type safe code prevents this by disallowing the referencing of array elements beyond those defined to be in the array.

Another means for securing the code itself is disclosed in U.S. Pat. No. 6,128,774, issued to Necula et al. This means involves providing a proof accompanying the code, certifying that the code is safe. The proof is a series of hints that makes the verification analysis discussed above much faster. The code is inspected, just as with the verification methods discussed above. A verification condition is generated from the code. This verification condition is easier to generate than the full-blown control flow analysis discussed above. Once the verification condition is generated, the untrusted proof then tries to discharge the verification condition. If the proof discharges the condition, then the code is safe. If the proof fails to discharged the condition, then the safety of the code is still unknown. This method is faster than the detailed control flow verification discussed above, but it still requires that processing time be spent generating the verification condition from the code and discharging the verification condition using the proof, and it requires that bandwidth be spent on transmitting the proof. Thus, methods are needed to prevent malicious code from executing without expending valuable time and computer resources on dynamic code verification.

SUMMARY OF THE INVENTION

The present invention provides methods for preventing malicious or otherwise harmful code from being executed on a computer, without expending valuable time and computer resources on dynamic code verification. A new safe code format is also provided, which facilitates the prevention from execution of malicious or otherwise harmful code.

In an aspect of an embodiment of the invention, an intermediate code format of a computer program preserves a safety feature found in the source code format of the computer program.

In another aspect of an embodiment of the invention, the intermediate code format preserves the safety feature by rendering inexpressible code that violates the safety feature.

In another aspect of an embodiment of the invention, an intrinsically safe intermediate code format is used.

In another aspect of an embodiment of the program, an unsafe intermediate code format is converted into a safe intermediate code format by annotating the unsafe intermediate code format with safety information.

In another aspect of an embodiment of the invention, registers containing data of various data types are separated by data type into data type planes.

In another aspect of an embodiment of the invention, references used to access memory locations are verified to be safe and stored in a safe data type plane, for later use in memory access.

BRIEF DESCRIPTION OF THE DRAWINGS

FIG. 3 is a flowchart of a method of compiling computer code, in accordance with an embodiment of the invention.

FIG. 4A is a representation of a code fragment in source code form.

FIG. 4B is a representation of the code fragment of FIG. 4A in SSA form, in accordance with an embodiment of the invention.

FIG. 5A is a representation of the code fragment of FIG. 4A, as a reference safe code fragment in safeTSA form, in accordance with an embodiment of the invention.

DETAILED DESCRIPTION OF THE PREFERRED EMBODIMENTS

Figure 1:
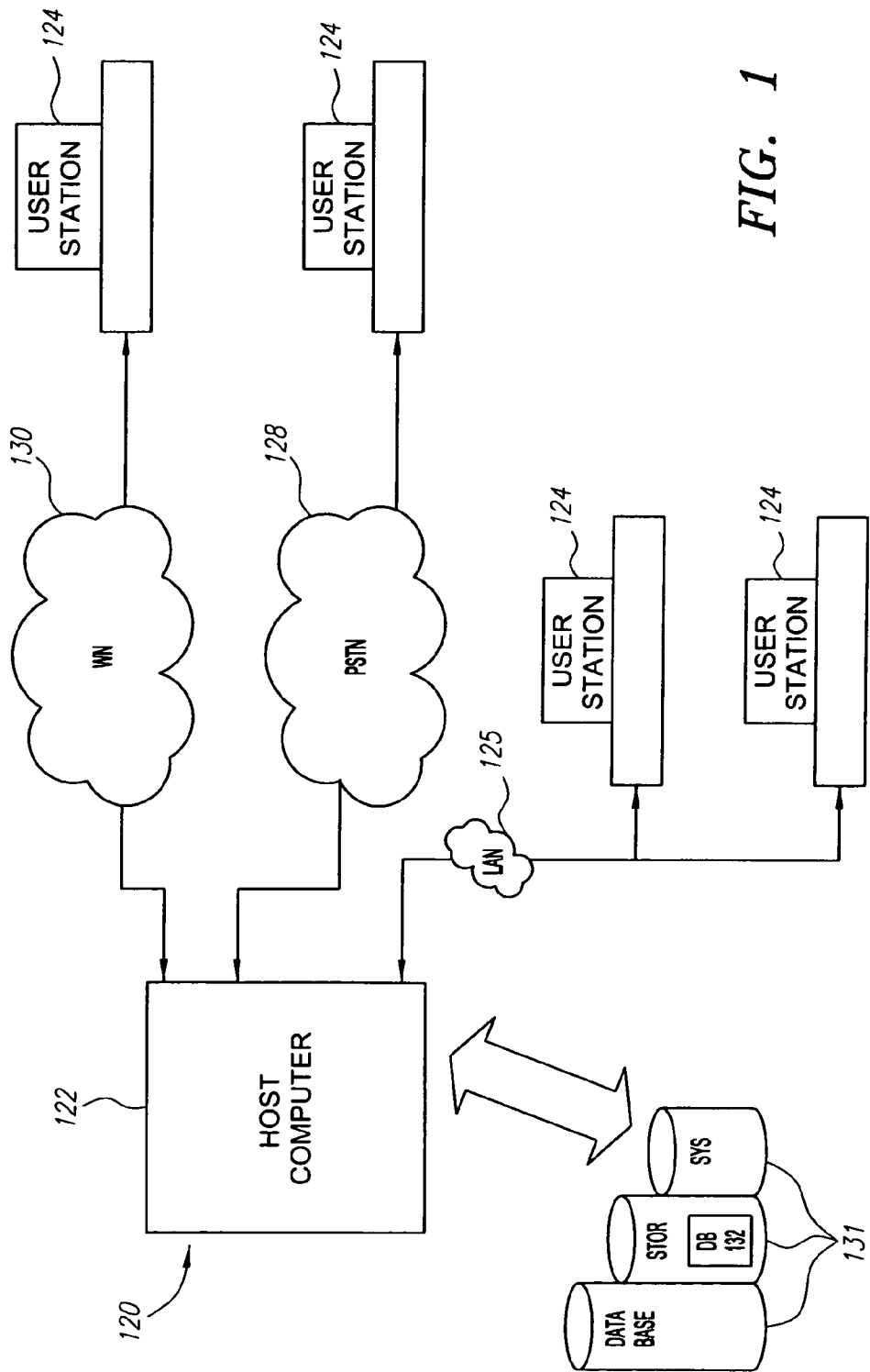
FIG. 1 is a representation of a computer system in accordance with an embodiment of the invention.

Referring to FIG. 1, in an embodiment a computer system 120 includes a host computer 122 connected to a plurality of individual user stations 124. The user stations 124 each include suitable data terminals, for example, but not limited to, e.g., personal computers, portable laptop computers, or personal data assistants ("PDAs"), which can store and independently run one or more applications or programs. For purposes of illustration, some of the user stations 124 are connected to the host computer 122 via a local area network ("LAN") 125. Other user stations 124 are remotely connected to the host computer 122 via a public telephone switched network ("PSTN") 128 and/or a wireless network 130. In an embodiment, the host computer 122 operates in conjunction with a data storage system 131 The data storage system 131 optionally contains a database 132 that is readily accessible by the host computer 122.

Figure 2:
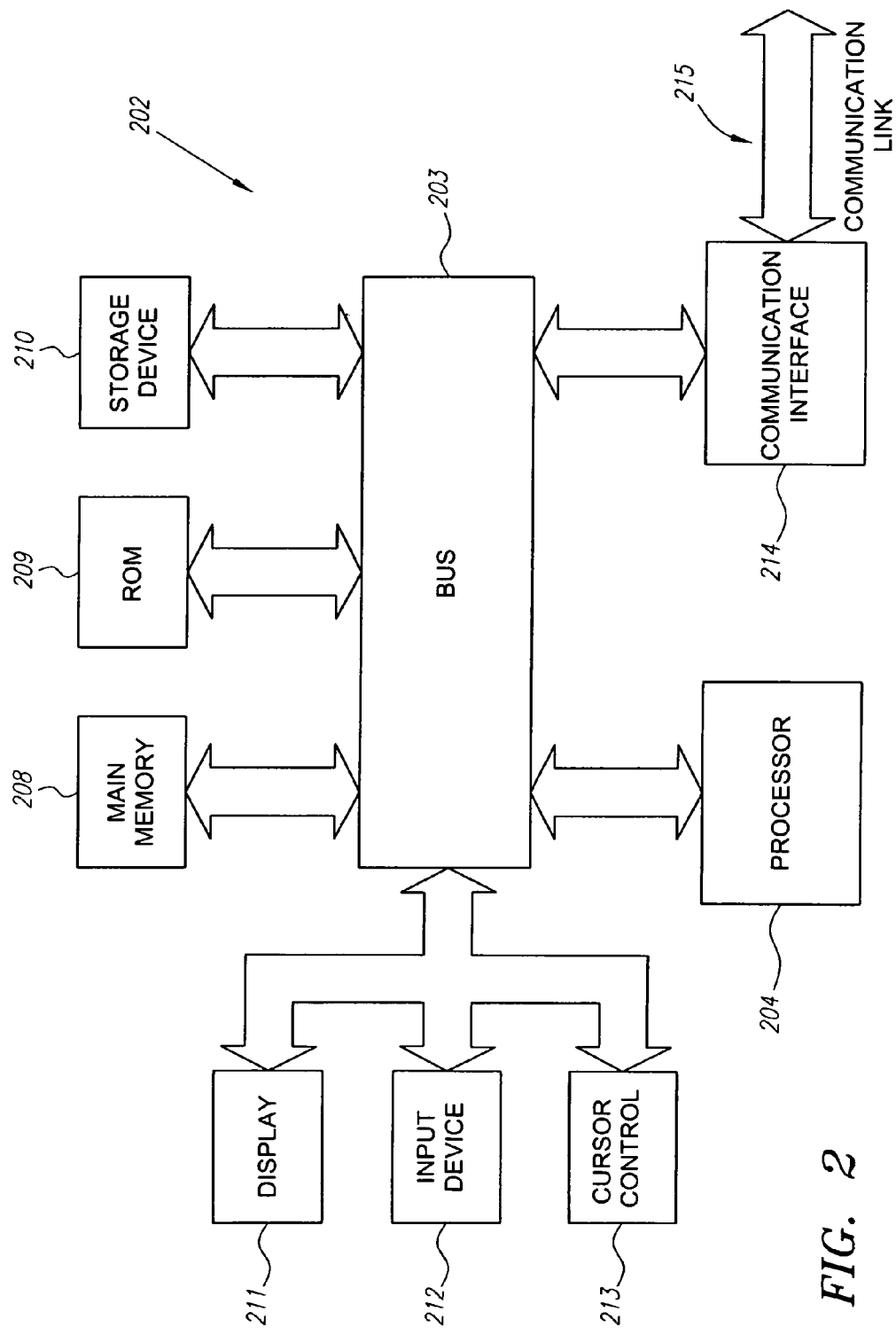
FIG. 2 is a representation of a processing unit in accordance with an embodiment of the invention.

Referring to FIG. 2, in an embodiment, each user station 124 and the host computer 122, each referred to generally as a processing unit, embodies a general architecture 202. A processing unit includes a bus 203 or other communication mechanism for communicating instructions, messages and data, collectively, information, and one or more processors 204 coupled with the bus 203 for processing information. A processing unit also includes a main memory 208, such as a random access memory (RAM) or other dynamic storage device, coupled to the bus 203 for storing dynamic data and instructions to be executed by the processor(s) 204. The main memory 208 also may be used for storing temporary data, i.e., variables, or other intermediate information during execution of instructions by the processor(s) 204.

A processing unit may further include a read only memory (ROM) 209 or other static storage device coupled to the bus 203 for storing static data and instructions for the processor(s) 204. A storage device 210, such as a magnetic disk or optical disk, may also be provided and coupled to the bus 203 for storing data and instructions for the processor(s) 204.

A processing unit may be coupled via the bus 203 to a display device 211, such as, but not limited to, a cathode ray tube (CRT), for displaying information to a user. An input device 212, including alphanumeric and other keys, is coupled to the bus 203 for communicating information and command selections to the processor(s) 204. Another type of user input device may include a cursor control 213, such as, but not limited to, a mouse, a trackball, a fingerpad, or cursor direction keys, for communicating direction information and command selections to the processor(s) 204 and for controlling cursor movement on the display 211.

According to one embodiment of the invention, the individual processing units perform specific operations by their respective processor(s) 204 executing one or more sequences of one or more instructions contained in the main memory 208. Such instructions may be read into the main memory 208 from another computer-usable medium, such as the ROM 209 or the storage device 210. Execution of the sequences of instructions contained in the main memory 208 causes the processor(s) 204 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 204. Such a medium may take many forms, including, but not limited to, non-volatile, volatile and transmission media. Non-volatile media, i.e., media that can retain information in the absence of power, includes the ROM 209. Volatile media, i.e., media that can not retain information in the absence of power, includes the main memory 208. Transmission media includes coaxial cables, copper wire and fiber optics, including the wires that comprise the bus 203. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, carrier waves, or any other medium from which a processor 204 can retrieve information.

Various forms of computer-usable media may be involved in providing one or more sequences of one or more instructions to the processor(s) 204 for execution. For example, the instructions may initially be provided on a magnetic disk of a remote computer (not shown). The remote computer may load the instructions into its dynamic memory and then transit them over a telephone line, using a modem. A modem local to the processing unit may receive the instructions on a telephone line and use an infrared transmitter to convert the instruction signals transmitted over the telephone line to corresponding infrared signals. An infrared detector (not shown) coupled to the bus 203 may receive the infrared signals and place the instructions therein on the bus 203. The bus 203 may carry the instructions to the main memory 208, from which the processor(s) 204 thereafter retrieves and executes the instructions. The instructions received by the main memory 208 may optionally be stored on the storage device 210, either before or after their execution by the processor(s) 204.

Each processing unit may also include a communication interface 214 coupled to the bus 203. The communication interface 214 provides two-way communication between the respective user stations 124 and the host computer 122. The communication interface 214 of a respective processing unit transmits and receives electrical, electromagnetic or optical signals that include data streams representing various types of information, including instructions, messages and data.

A communication link 215 links a respective user station 124 and a host computer 122. The communication link 215 may be a LAN 125, in which case the communication interface 214 may be a LAN card. Alternatively, the communication link 215 may be a PSTN 128, in which case the communication interface 214 may be an integrated services digital network (ISDN) card or a modem. Also, as a further alternative, the communication link 215 may be a wireless network 130.

A processing unit may transmit and receive messages, data, and instructions, including program, i.e., application, code, through its respective communication link 215 and communication interface 214. Received program code may be executed by the respective processor(s) 204 as it is received, and/or stored in the storage device 210, or other associated non-volatile media, for later execution. In this manner, a processing unit may receive messages, data and/or program code in the form of a carrier wave.

In the computer system 120, it is sometimes desirable to verify that code being executed on the computer system 120 is safe to execute. That is, the code is not going to do dangerous things to the computer system 120, such as overflow the space allocated to a variable, causing unauthorized, possibly malicious changes to the operation of the computer system 120.

Code safety begins with the code being type-safe, because a breach of the type system defined for a computer code language can be used to subvert many other forms of code safety guarantees. In recognition of the importance of type safety, many modern source code languages are designed to be type safe. However, the use of a type safe source code language does not by itself remove the need for verification of code prior to execution of the code. This is because it cannot be guaranteed that the code to be executed on the computer system 120 ever originated as a valid source code language program in the first place—for example, it might instead have been explicitly hand-crafted to corrupt the computer system 120.

To better understand the risks that the use of different code formats introduces into code safety, a discussion of the stages of an example of a computer code compiler, as shown in FIG. 3, will now be discussed. The compiler discussed in FIG. 3 compiles a source code program into an executable code program. The compiler starts out at step 310, where it reads in the text of the source code program to be compiled. This source code can be any high-level programming language, such as Java, Fortran, ADA, etc. The compiler then parses the source code to extract lexical tokens, at step 320. A lexical token is a discrete string of text that has a particular meaning within the grammar of the source code language. For example, a reserved word such as WHILE is a lexical token that signals the start of a WHILE . . . DO looping construct. Another example of a lexical token is <sp>*<sp>, where <sp> refers to a blank space, and * refers to a series of one or more alphanumeric characters. This is the lexical token for a generic word in the grammar.

At step 330, the lexical tokens are used to generate a first intermediate code format representation including an abstract syntax tree (AST) representation of the program. An abstract syntax tree is a tree representation of the source code language program, abstracting away concrete details, such as symbols used to open or close a block of statements, variable names, comments, etc. The AST representation contains information about the nature of the program, without including extra information that caters to human or machine readability of the program. For many source code languages, the control flow and dominator information can easily be extracted from the AST. Alternatively, the AST, control flow and dominator information may all be integrated into a single representation.

At step 340, a second intermediate code format representation including a medium-level internal representation of the computer program is generated from the AST representation. This medium-level representation is used by the compiler to analyze the program and transform it for optimization. Some optimizations, such as common sub-expression elimination and dead code elimination are performed here. The medium-level internal representation is usually independent of the final compilation target. That is, the same medium-level representation can be used to generate executable code for a variety of different target machines. Examples of medium-level internal representations include static single assignment (SSA) form and safe typed single assignment (safeTSA) form, both discussed below.

At step 350, the medium-level internal representation is transformed into a third intermediate code format representation including a low-level internal representation, which makes explicit the actual target machine instructions to be used. This representation is dependent on the compilation target, and is designed to allow scheduling, resource allocation and additional target-dependent optimizations to be performed. Examples of low-level internal representations include register transfer language (RTL) and assembler.

Finally, at step 360, the low-level internal representation is transformed into a machine language representation, containing the actual binary bits to be executed on the target machine. The compilation process then ends, and the machine language representation can be stored or executed on the target machine. Those skilled in the art will appreciate that the compilation process described in FIG. 3 is an example, and that the compilation process may have different, possibly more or fewer steps than those described for the example compiler above.

During the compilation process of FIG. 3, the code passes through several different representations, in several different intermediate code formats. Additionally, the stages of the compilation process may not all be performed at the same time or even on the same machine. There is no guarantee that the code representation of a particular stage of the compilation process ever actually originated in a source code representation. Thus, there is no guarantee that the code representation contains any of the safety guarantees found in the source code representation. For example, at step 350 the compilation process receives what is believed to be the medium-level internal representation from step 340. The code received by step 350 might be code that was generated following the steps 310–340, which therefore includes all of the safety guarantees contained in the source code language, such as type safety. However, the code received by step 350 might also be malicious code that was either hand-crafted, in the medium level internal representation, or constructed by altering the medium-level representation derived from steps 310–340, to bypass the safety guarantees found in the source code language. Thus, if the malicious code is further compiled and executed, the malicious code will cause damage to the target machine.

This problem is solved by constructing an intermediate code format representation using an intermediate code format that preserves the safety guarantees found in the source code language in all circumstances, even where the intermediate code format representation has been altered, or where the intermediate code format representation never originated with a valid source code representation of the code. An intermediate code format that preserves the safety guarantees of the source code language also enables automatic support for any future user-specified safety policy that can be expressed in the source code language. Such an intermediate code format is called a safe code format.

The medium-level internal representation discussed above is a good representation to use as the starting point for constructing the intermediate code format representation, since some optimizations have already been performed, yet the medium-level representation is still machine independent. Additionally, since the medium-level internal representation has already been partially optimized, reverse-engineering the medium-level internal representation is difficult to do, thus providing a further protection to the source code.

For an example of a user-specified safety policy expressible in the source code language, consider a particular language that provides an extension to variables that specifies a security attribute of the variable's owner, such as the procedure or other code component that created the variable. Using this extra parameter, information flow can be restricted to only occur from low security to high security, but not vice versa. Once the underlying safety guarantees, such as type safety, found in the source code language are preserved in the intermediate code format, this property, and any other property that can be expressed in the source code language, is easily supported by the grammar-based code safety scheme discussed herein.

An embodiment where type safety is preserved in a safe code format including an intermediate code format will now be discussed in more detail. The safe code format of an embodiment is related to static single assignment (SSA) format, incorporating several new and unique safety features. The safe code format will be referred to hereinafter as "safe typed single assignment form," or "safeTSA." Another advantage of using a format related to SSA, such as safeTSA format, as the safe code format is that the compiler is able to directly use the safeTSA format in the compilation process to generate good native code. Use of other code formats such as Java Bytecodes would require the compiler to waste valuable processing time in converting the other code format into a format more appropriate for optimized compilation, such as an SSA or safeTSA based format.

A discussion of SSA format is useful for an understanding of safeTSA format. SSA is an intermediate code format in which every variable present in the SSA format representation of a computer program is assigned exactly once. This transformation introduces several different names for every variable of the original source code program—at least as many as there are assignments to the source code variable in the static program representation. Where the source code program uses a looping construct, there may be several dynamic assignments to the same variable, as the control flow iterates through the looping construct multiple times. SSA format, however, is only concerned with static assignments.

Wherever two different control flows are joined, any different incarnations of the same original variable are combined using a special phi-function. A phi-function takes as inputs all of the possibly valid incarnations of the same original variable, and generates as an output the incarnation that corresponds to the path the control flow actually took in getting to the phi-function. The ordering of the arguments to the phi-function corresponds to the ordering of the incoming control flows.

For example, FIG. 4A shows a source code program fragment 410. This source code program fragment 410 is a series of statements 412, which provide instructions to the computer system 120 (of FIG. 1.), in human-readable form. The source code program fragment 410 is used as input to the compilation process discussed in FIG. 3, to generate machine-readable executable code.

Turning to FIG. 4B, the equivalent SSA format representation 420 of the source code program fragment 410 is shown. The SSA format representation 420 is broken into basic SSA blocks 430. Each basic SSA block 430 is a sequence of consecutive instructions in which control flow enters at the beginning and leaves at the end, without halt or possibility of branching except at the end. Thus, control flow in the SSA format representation 420 flows into the first basic SSA block 430a, and then flows to either the second basic SSA block 430b or the third basic SSA block 430c, depending on the results of the branch-greater-than (bgt) statement at the end of the first basic SSA block 430a, and finally flows from either the second basic SSA block 430b or the third basic SSA block 430c to the fourth basic SSA block 430d.

The lines in the SSA format representation 420 are generated from the instructions in the source code program fragment 410 that produce values. The individual instructions in the SSA format representation 420 (and thereby implicitly the values that they generate) are labeled by integer numbers assigned consecutively. An arrow to the left of each instruction points to a label that designates the specific target register implicitly specified by each instruction. Thus, the results of the add (i) 1 instruction are stored in register 6, the results of the add (j) 1 instruction are stored in register 7, and so on. References to previously computed values in other instructions are denoted by enclosing the label of the previous value in parentheses. Thus, in the cmp (6) (7) instruction, the value computed in instruction 6 and the value computed in instruction 7 are compared to each other. The references (i) and (j) refer to the instructions (not shown) that computed the initial values of i and j. As can be seen by comparing the source code program fragment 410 with the SSA format representation 420, the variable i is assigned three times in the source code program fragment 410, whereas in the SSA format representation, a different assignment is made, to a different register, each time the variable i is assigned.

A problem with using the SSA format representation 420 as an intermediate code format lies in verifying the correctness of all the references. SSA format is unsuitable for application domains that require verification of referential integrity where possibly malicious code exists. This is because SSA contains an unusually large number of references needing to be verified, which makes the verification process non-trivial and very expensive. For example, to preserve correctness, value (10) must not be referenced anywhere following the phi-function in (12), and may only be used as the first parameter but not the second parameter of this phi-function. A malicious code supplier might want to provide an illegal program in which instruction (13)

references instruction (10), while the program takes the control flow path through (11). This would violate referential integrity and must be prevented.

A solution to the above-identified problem is shown in FIG. 5A. A safeTSA format representation 520 is shown of the source code fragment 410. The safeTSA format representation 520 is broken into basic safeTSA blocks 530. Each basic safeTSA block 530 is a sequence of consecutive instructions in which control flow enters at the beginning and leaves at the end, without halt or possibility of branching except at the end. Thus, control flow in the safeTSA format representation 520 flows into the first basic safeTSA block 530a, and then flows to either the second basic safeTSA block 530b or the third basic safeTSA block 530c, depending on the results of the branch-greater-than (bgt) statement at the end of the first basic safeTSA block 530a, and finally flows from either the second basic safeTSA block 530b or the third basic safeTSA block 530c to the fourth basic safeTSA block 530d.

Figure 5B:
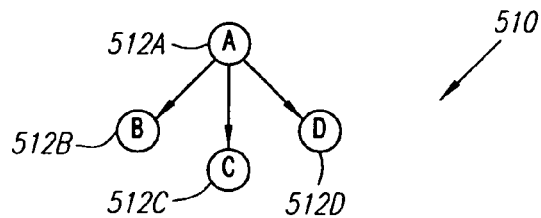
FIG. 5B is a dominator tree representation of the code fragment of FIG. 5A

FIG. 5B depicts a dominator tree 510 of the safeTSA format representation 520. The dominator tree 510 includes a first node 512a, corresponding to the first basic safeTSA block 530a, a second node 512b corresponding to the second basic safeTSA block 530b, a third node 512c corresponding to the third basic safeTSA block 530c, and a fourth node 512d corresponding to the fourth basic safeTSA block 530d. A dominator basic safeTSA block is said to dominate a dominated basic safeTSA block if every path from the initial basic safeTSA block of the safeTSA format representation 520 to the dominated basic safeTSA block flows through the dominator basic safeTSA block. Thus, in FIG. 5A, the first basic safeTSA block 530a dominates the second basic safeTSA block 530b, the third basic safeTSA block 530c and the fourth basic safeTSA block 530d. Note that the second basic safeTSA block 530b does not dominate the fourth basic safeTSA block 530d, since it is possible to get from the first basic safeTSA block 530a to the fourth basic safeTSA block 530d via the third basic safeTSA block 530c, bypassing the second basic safeTSA block 530b.

As in SSA format, the dominator-relative numbering scheme of an embodiment of the present invention provides that an instruction references values that dominate it, i.e. that lie on the path leading from the entry point of a dominator tree of the safeTSA format representation 520 to the referencing instruction. However, the safeTSA format includes a unique block and instruction based referencing scheme in which the instructions are annotated with block identifying information and an instruction identifier. For example, the add (i) 1 instruction of the first basic safeTSA block 530a is annotated with A-6, which indicates that the instruction is in basic safeTSA block A, and is instruction 6 of that basic safeTSA block. References to prior instructions are represented by a pair of values (blk-ins), in which blk denotes a basic safeTSA block expressed in the number of levels that it is removed from the current basic safeTSA block in the dominator tree 510, and in which ins denotes a relative instruction number in that basic safeTSA block. For example, the fourth instruction (annotated as A-9) of the first basic safeTSA block 530a, is bgt (0-8). The (0-8) operand annotation indicates that this instruction is referring to instruction 8 of the same basic safeTSA block. The add (1-7) (0-0) instruction in the fourth basic safeTSA block 530d references two prior instructions. The operand annotation (1-7) refers to instruction 7 of the first basic safeTSA block 530a, which is the basic safeTSA block one level above the fourth basic safeTSA block 530d in the dominator tree 510. The operand annotation (0-0) refers to instruction 0 of the fourth basic safeTSA block 530d, which is the same block as the block containing the operand annotation (0-0).

For phi-instructions, a blk-index of 0 denotes the appropriate preceding block along the safeTSA format representation 520 (with the nth argument of the phi-function corresponding to the nth incoming branch, e.g. phi (1st arg) (2nd arg) (3rd arg) (nth arg)). Higher numbers correspond to the dominators of the appropriate preceding block. For example, the phi (0-0)(0-0) instruction of the fourth basic safeTSA block 530d contains two arguments. The first argument refers to instruction 0 of the first preceding block, which in FIG. 5 is the second basic safeTSA block 530b. The second argument refers to instruction 0 of the second preceding block, which in FIG. 5 is the third basic safeTSA block 530c.

Figure 6:
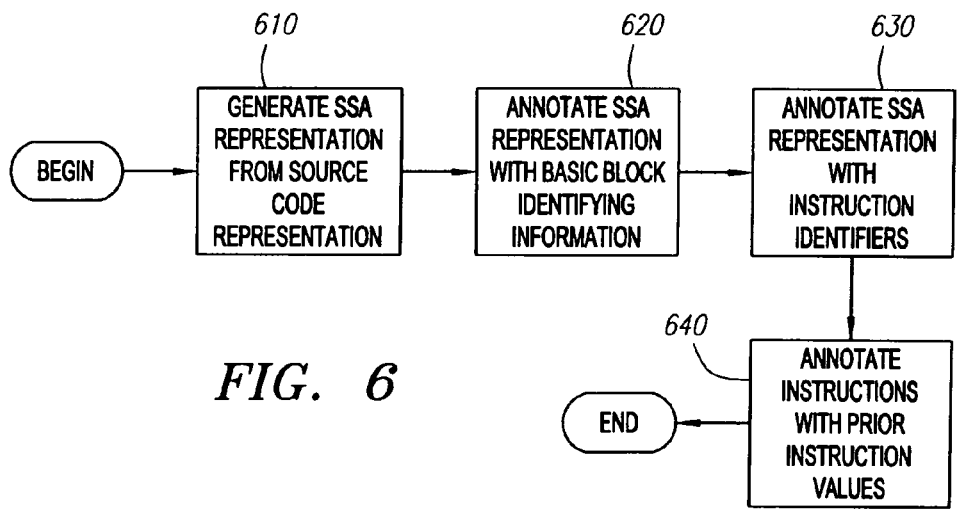
FIG. 6 is a flowchart of a method for generating safeTSA format code, in accordance with an embodiment of the invention.

The resulting safeTSA format representation 520, using the (blk-ins) value-references, provides referential integrity intrinsically without requiring any additional verification besides the trivial ones of ensuring that each relative instruction number reference ins doesn't exceed the permissible maximum, based upon the number of instructions contained in the basic safeTSA block referenced by the basic safeTSA block reference blk, and ensuring that the value of blk does not exceed the current block's height in the dominator tree 510. These facts can actually be exploited to enable encoding the (blk-ins) pair space-efficiently The safeTSA format representation 520 is generated according to the method of FIG. 6. At step 610, an intermediate code format representation, such as the SSA format representation 420, is generated from a source code representation of the computer program. At step 620, each instruction in the intermediate code format representation is annotated with basic safeTSA block information. At step 630, each instruction in the intermediate code format representation is annotated with an instruction identifier. At step 640, each instruction that refers to a value computed in a prior instruction is annotated with information that references the prior instruction based on the (blk-ins) coding scheme discussed above, using the basic safeTSA block information and the instruction identifier annotated above.

Figure 7:
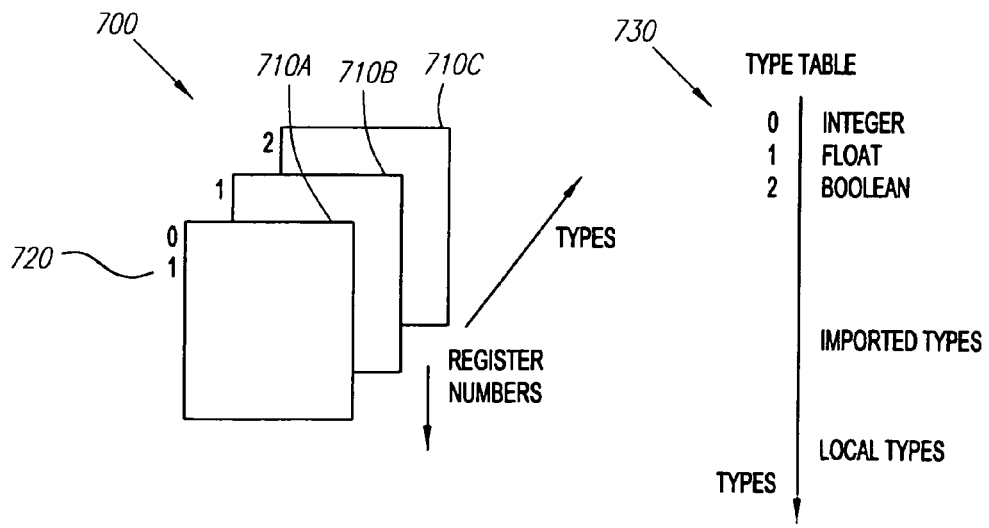
FIG. 7 is a representation of register planes, in accordance with an embodiment of the invention.

The safeTSA format also incorporates type separation. While the SSA format discussed above is one with an unlimited number of registers (each register containing a value of a variable), the safeTSA format uses a model in which there is a separate register plane for every data type. The register planes are created implicitly, taking into account the pre-defined types, imported types and local types occurring in the computer program. FIG. 7 depicts the organization of register planes within the safeTSA format. The safeTSA format includes register planes 710. Each register plane 710 contains registers 720. The register planes 710 are each restricted to containing registers 720 of a single data type. Referring to the type table 730, it can be seen that the first register plane 710a contains integer registers 720, the second register plane 710b contains float registers 720, the third register plane 710c contains boolean registers 720, and so on. Within each register plane 710, the registers 720 are enumerated sequentially in ascending order.

Type safety is achieved by turning the selection of the appropriate register plane 710 into an implied part of the operation, rather than making the selection explicit and therefore corruptible. In the safeTSA format, an instruction automatically selects the appropriate register plane 710 for the source and destination registers 720. The operands of the instruction merely specify the particular registers 720 on the thereby selected register plane 710. The destination register 720 on the appropriate destination register plane 710 is also chosen implicitly—on each register plane 710, the registers 720 are simply filled in ascending order as they are assigned in the safeTSA format representation of the computer code.

For example, the operation integer-addition takes two register numbers as its parameters, src1 and src2. The operation will implicitly fetch its two source operands from register src1 on the integer register plane 710*a* and register src2 on the integer register plane 710*a*, and deposit its result in the next available register 720 on the integer register plane 710*a*. There is no way a malicious adversary can change integer addition to operate on operands other than integers, or generate a result other than an integer, or even cause holes in the register plane 710 for any basic block. To give a second example, the operation integer-compare takes its two source operands from the integer register plane 710*a* and deposits its result in the next available register 720 on the boolean register plane 710*c*.

Figure 8:
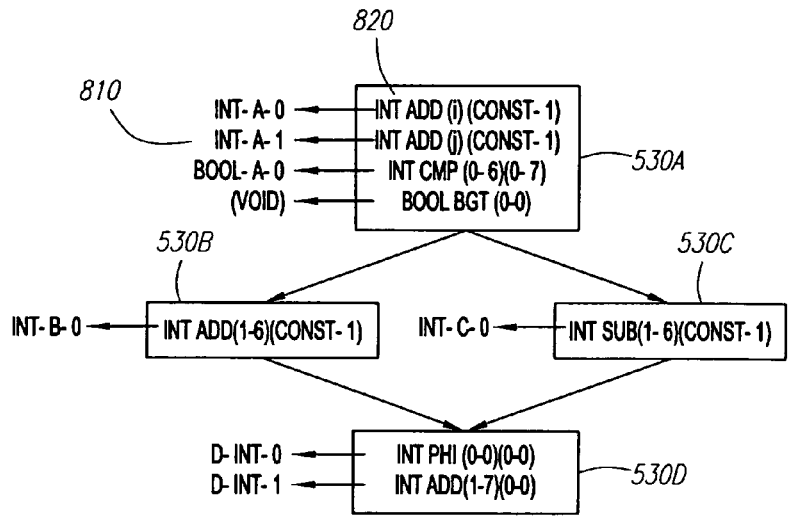
FIG. 8 is a representation of the code fragment of FIG. 4A, as a type-separated reference-safe code fragment in safeTSA form, in accordance with an embodiment of the invention.

The safeTSA format combines this type separation with the concept of referential integrity discussed in the previous section. Hence, beyond having a separate register plane 710 for each data type, the safeTSA format also has a complete two-dimensional register set 700 for every basic block in the safeTSA format representation of the computer program. FIG. 8 depicts the combination of type separation and referential integrity in the safeTSA format, as applied to the source code fragment 410 (of FIG. 4A). Each instruction has an annotation 810 with information identifying the register set 700, register plane 710, and register 720 where the results of the instruction are stored. Each instruction also has a data type 820 shown for it. This data type 820 represents the required type of the operands of the instruction. Thus, the instruction int add (i) (const-1) takes as inputs the two integers (i) and (const-1), and generates an integer output, which is stored in the register set 700 associated with the first basic safeTSA block 530*a*, on the integer register plane 710*a*, in the register 720 labeled 0. (const-1) refers to the second (0 would be first) value on the appropriate type plane's constant pool. Here, since the appropriate type plane is the integer type plane, the second value should be 1 (the first value would be 0). Similarly, the instruction int -add (1-7) (0-0) in the fourth basic block 530*d* takes as inputs the two integers (1-7) and (0-0), and generates an integer output, which is stored in the different register set 700 associated with the fourth basic safeTSA block 530*d*, on the integer register plane 710*a*, in the register 720 labeled 1. Recall that the integer (1-7) refers to the value generated by instruction 7 in the node 512*a*, one level removed from the node 512*d* containing the add instruction as shown in the dominator tree 510 of FIG. 5. Similarly the integer (0-0) refers to the value generated by instruction 0 in the node 512*d*, which is zero levels removed form the node 512*d* containing the add instruction. For a further example, the instruction phi (0-0) (0-0) in the fourth basic safeTSA block 530*d* takes as inputs the two integers (0-0) and (0-0), which for a phi-function represent the two incoming values on the two branches into the fourth basic safeTSA block 530*d*, and generates an integer output representing the value present on the branch actually traversed to reach the phi-function. The integer output is stored in the register set 700 associated with the fourth basic safeTSA block 530*d*, on the integer register plane 710*a*, in the register 720 labeled 0.

The safeTSA format also incorporates memory safety. For a memory reference type ref, the safeTSA format provides a matching type safe-ref that implies that the corresponding value has been null-checked. Similarly, for an array arr, a matching type safe-index-arr is provided, whose instances may assume only values that are index values within the legal range defined for the array arr.

In some embodiments containing dynamically sized arrays, safe-index types are bound to array values rather than to their static types. The size of an array may not be known statically, but once the array object has been created, its size will remain constant. As a consequence, an index that is safe to use with any given reference will remain safe throughout the lifetime of that safeTSA array reference (which is not necessarily the same as the lifetime of the underlying array variable).

The safeTSA format approaches type safety in a conservative manner: for each arr value, a safe-index-arr type that signifies a value that can safely be used as an index for this arr value is created.

As a further consequence of the approach used with the safeTSA format, a safe-index value can only pass through phi-instructions that are dominated by the corresponding safe-ref value for the underlying array (the safe-type must cease to exist when the value ceases to exist). This results in giving data types a limited scope based on the dominator relationship, just as with the SSA and safeTSA values discussed above.

The null-checking safety feature then becomes an operation that takes an explicit ref source type and an explicit register number on the corresponding register plane. If the check operation succeeds, the ref value is copied to an implicitly given register (the next available) on the plane of the corresponding safe-ref type, otherwise an exception will be generated. This operation is translated into an explicit runtime null-check on the target machine, and is the only way to convert a normal ref value into a safe-ref value. Similarly, the index-check safety feature operation takes an array and the number of an integer register, checks that the integer value is within bounds (with a concomitant runtime check), and if the check succeeds, copies the integer value to the appropriate safe-index register plane.

This approach enables the transport of null-checked and index-checked values across phi-joins. Phi-functions are type-separated: all operands of a phi-function, as well as its result, reside on the same register plane. When it is desired to combine a ref-type and the corresponding safe-ref type in a single phi-function, the safe-ref type is downcast to the corresponding unsafe ref type first. The downcast operation is a modeling function of the safeTSA format, and will not result in any actual code on the eventual target machine.

Null-checking and index-checking can be generalized to include all typecast operations: an upcast operation involves a dynamic check and will cause an exception if it fails. In the case of success, the upcast operation will copy the value being cast to the next available free register on the plane of the target type. The dynamic check results in target machine code being created. The downcast operation is only allowed where the type cast is known to be statically safe (e.g. casts from a class's safe-ref type to its ref type, or from a class's ref type to its superclass's safe-ref), and therefore has no runtime overhead.

Memory operations in safeTSA format are then performed using the safe types. That is, these operations take operands from the register plane of a safe-ref or safe-index type, but not from the corresponding unsafe types, ref or index. In an embodiment, there are four different primitives for memory access:

Getfield ref-type object field
Setfield ref-type object field value
Getelt array-type object index
Setelt array-type object index value Where ref-type denotes a reference type in the type table (e.g. integer, float, boolean), object designates a register number on the plane of the corresponding safe-ref type, field is a symbolic reference to a data member of ref-type, and value designates a register number on the plane corresponding to the type of field. Similarly, for array references, object designates a on the register plane of the array type that contains the array's base address and index designates a register on the array's safe-index register plane that contains the index value.

The setfield and setelt operations are used to modify memory, and they do this in accordance with the type declarations in the type table. Most of the entries in this type table are not actually taken from the computer program itself and hence cannot be corrupted by a malicious code provider. While the pertinent information may be included in the computer program while it proceeds through the stages of the compiler, to ensure safe linking, those parts of the type table that refer to primitive types of the underlying source code language or to types imported from the target machine's libraries are generated implicitly and are therefore tamper-proof. This suffices in providing memory-safety of the target machine in the presence of malicious code.

The preceding discussion mentioned built-in operations such as integer-add and integer-compare, bringing up the question of which primitives are built into the safeTSA format. Primitives in safeTSA format are subordinated to types, and there are two generic instructions:

primitive base-type operation operand1 operand2 . . .
xprimitive base-type operation operand1 operand2 where base-type is a symbolic reference into the type table, operation is a symbolic reference to an operation defined on this type, and operand1 . . . operandN designate register numbers on the respective register planes corresponding to the parameter types of the operation. In each case, the result is deposited into the next available register on the register plane corresponding to the result type of the operation.

The difference between primitive and xprimitive concerns exceptions. Operations that may potentially cause an exception (such as integer divide) are referenced using the xprimitive instruction. An occurrence of an xprimitive instruction in a basic block automatically leads to an additional incoming branch to the phi-functions in the appropriate error-handling join blocks.

Note that it is up to the type system of the source code language being represented in the safeTSA format to specify what operations on which types may actually generate exceptions. For example, the type Java.lang.primitive-integer provides add, subtract and multiply among its primitives and divide among its xprimitives, but another language that is less lenient about arithmetic overflow conditions might define all four operations add, subtract, multiply and divide as xprimitives for its particular integer type.

Primitive operations for accessing constants and parameters are not required in the safeTSA format. Constants can be implicitly pre-loaded into registers of the appropriate types in the initial basic block of each procedure. Note that this pre-loading feature is another example of an operation that merely occurs on the safeTSA level and that doesn't correspond to any actual code being generated on the target machine.

Just as a set of operations is associated with each primitive type, a table of methods is associated with a reference type. This table is built from local method definitions and from a list of imported methods. Two primitives provide method invocation with and without dynamic dispatch:

xcall base-type receiver method operand1 operand2
xdispatch base-type receiver method operand1 operand2 . . .

where base-type identifies the static type of the receiver object, receiver designates the register number of the actual receiver object on the corresponding register plane, method is a symbolic reference to the method being invoked, and operand1 . . . operandN designate register numbers on the respective register planes corresponding to the parameter types of the method. The result is deposited into the next available register on the register plane corresponding to the result type of the method.

The symbolic method may reference any method which can be invoked on the static type denoted by base-type. For xcall, this determines the actual code that will be executed on the target machine, but for xdispatch, it determines a slot in the static type's dispatch table that will be polymorphically associated with a method by the dynamic type of the instance referenced by receiver. In some embodiments, the compiler resolves overloaded methods and inserts explicit downcast operations for any operands whose static type does not match the type of a method's corresponding formal parameter.

Figure 9:
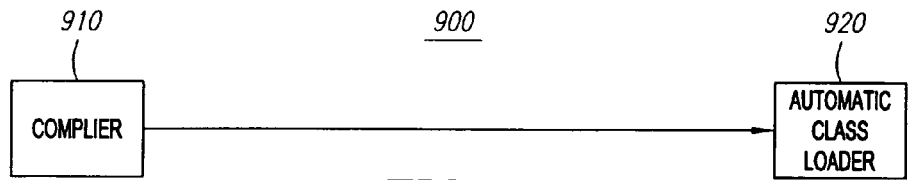
FIG. 9 is a representation of a system for transporting mobile code, in accordance with an embodiment of the invention.

An example embodiment that transforms Java source files into safeTSA format, depicted in FIG. 9, will now be discussed. The system includes a compiler 910 that takes Java source files and translates them into the safeTSA format, and a dynamic class loader 920 that takes safeTSA code distribution units and executes them using on-the-fly code generation. The compiler 910 operates on the host computer 122 of FIG. 1. The dynamic class loader 920 operates on the user stations 124 of FIG. 1. The front-end of the compiler 910 takes as input either Java classes or packages in source code form and for each class in the input, produces a file containing a compressed version of the safeTSA format representation of that class.

Figure 10:
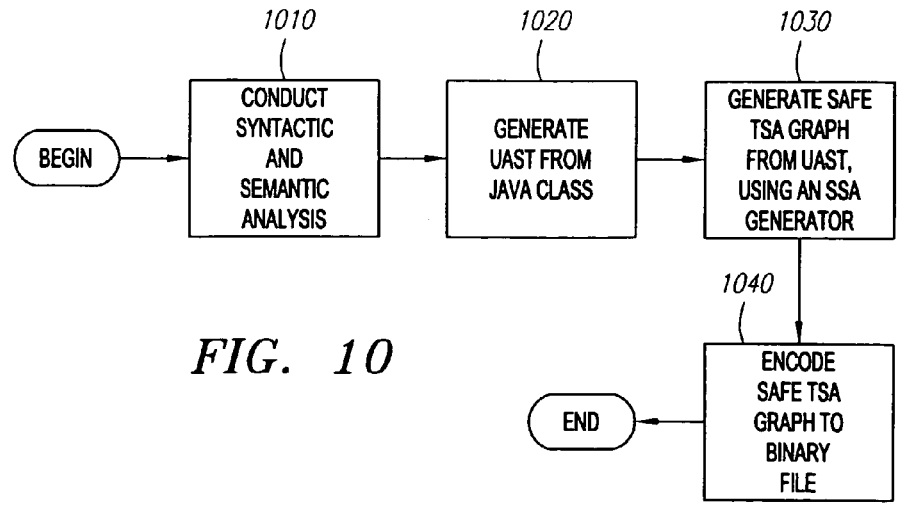
FIG. 10 is a flowchart of a method of preparing mobile code for transportation, in accordance with an embodiment of the invention.

The transformation of a Java class to its safeTSA representation is performed using the method of FIG. 10. After successful syntactic and semantic analysis at step 1010, the Java class is transformed into a Unified Abstract Syntax Tree (UAST) at step 1020. Next, an SSA generator transforms the UAST into a safeTSA format graph at step 1030, which is then encoded into a binary stream and written to a file, at step 1040.

Using a UAST allows for extensibility of the system to handle input languages other than Java. The UAST combines the structural elements of Java, Fortran95, and ADA95 in a single data structure. Therefore, it is easy to support the compilation of Fortran95 and ADA95 programs. A benefit of this type of AST is to integrate the dominator and control flow information into the same structure. The use of a binary tree simplifies code generation and optimization.

The compiler 910 constructs the SSA form and the dominator relation of the program to be transformed in a single pass from the source code form, and adapts this method to work on the UAST. The compiler 910 also improves the handling of return, continue and break instructions in the source code form, to avoid inserting phi-instructions where there are fewer than two feasible paths. To eliminate superfluous phi-instructions, dead code elimination is performed based on the calculation of live variables as suggested by Briggs et al., Practical improvements to the construction and destruction of static single assignment form. Software Practice and Experience, 28(8):859–881, July 1998.

Transformation from the UAST into safeTSA form is limited to expressions and assignments. This leads to the partitioning of the safeTSA graph into a Control Structure Tree, i.e. the structural part of the UAST, and the safeTSA part. Java short-circuit operators that alter control-flow are handled by translating them into if-else statements and allowing these if-else statements in all expression contexts. From the Control Structure Tree a coherent control flow graph and dominator tree are derived efficiently, facilitating high-quality code generation by providing high-level programs and blocks of safeTSA format code. This, for example, eases the determination of induction variables for use in software pipelining.

To enforce correct semantics of Java threads, only local variables are considered as values, in contrast to global variables that must be accessed via getfield or setfield instructions as the contents of such variables may be changed at any time. In encoding the Java try-catch-finally construct, at any point in the control flow where an exception may occur, the basic block is split into linked sub-blocks where each sub-block has only one entry and one exit point. An implied control-flow edge is created from each potential point of exception to a special exception-handling basic block containing a special phi-function that is the predecessor of all the catch blocks. Because the safeTSA format representation has a default, possibly empty, catch block, the finally block is a successor of the catch blocks and also a successor of any break, continue or return nodes inside the try block.

The safeTSA format is designed such that it can be externalized as a sequence of symbols, where each symbol is chosen from a finite set determined only by the preceding context. The encoder transmits these symbols in three phases. First, it encodes the Control Structure Tree as a sequence of productions of its grammar. Second, it transmits the safeTSA format code blocks in a fixed order, derived from the Control Structure Tree, corresponding to a pre-order traversal of the dominator tree. Each instruction is encoded as opcodes, types and operands as were discussed earlier, but only the type information of the phi-instructions is encoded during this stage. Third, the encoder transmits the phi-instruction operands. Phi-instruction operands are postponed because they may reference instructions that do not precede them in the pre-order traversal. Since each of these symbols is chosen from a finite set, any dictionary encoding scheme can be used to convert the symbol sequence into a binary stream, such as a simple prefix encoding or a Huffman encoding.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense, and the invention is not to be restricted or limited except in accordance with the following claims and their legal equivalents.

We claim:

1. A computer program product that includes a medium usable by a processor, the medium comprising a sequence of instructions which, when executed by said processor, causes said processor to execute a method of generating safe code from a source code representation, the method comprising:

generating an intermediate code format representation from the source code representation, the intermediate code format representation comprising at least a first and a second basic block, the first basic block having a first domination level in a dominator tree, the second basic block having a second domination level in a dominator tree, higher than the first domination level, the first basic block dominating the second basic block by an offset value between the first domination level and the second domination level, the first basic block comprising a plurality of instructions including a first instruction, the second basic block comprising at least a second instruction, the second instruction comprising an operand;

annotating the plurality of instructions in the first basic block with basic block identifying information; the basic block identifying information identifying the first basic block;

annotating the first instruction in the first basic block with an instruction identifier indicating a relative position of the first instruction within the plurality of instructions in the first basic block;

identifying a maximum instruction identifier value for the first basic block, the maximum instruction identifier value comprising the highest relative position for the plurality of instructions in the first basic block;

annotating the operand of the second instruction with a relative basic block identifier, the relative basic block identifier identifying the first basic block by specifying the offset value;

annotating the operand of the second instruction with the instruction identifier;

verifying the second instruction by ensuring that the instruction identifier annotated to the operand of the second instruction does not exceed the maximum instruction identifier value;

verifying the second instruction by ensuring that the relative basic block identifier does not exceed the second domination level;

converting the intermediate code format representation into an executable format representation; and executing the executable format representation.

2. The computer program product of claim 1, wherein the intermediate code format representation is generated in static single assignment format.

3. The computer program product of claim 1, wherein the intermediate code format representation is generated in safe typed single assignment format.

4. The computer program product of claim 1, wherein the source code representation is a type-safe source code representation.

5. The computer program product of claim 1, wherein reverse engineering of the intermediate code format representation is inhibited by incorporating a code optimization into the intermediate code format representation.

6. A computer program product that includes a medium usable by a processor, the medium comprising a sequence of instructions which, when executed by said processor, causes said processor to execute a method of verifying an intermediate code representation of a computer program, the method comprising:

receiving the intermediate code format representation of the computer program, the intermediate code format representation comprising at least a first and a second basic block, the first basic block having a first domination level in a dominator tree, the second basic block having a second domination level in a dominator tree, higher than the first domination level, the first basic block dominating the second basic block by an offset value between the first domination level and the second domination level, the first basic block comprising a plurality of instructions including a first instruction, the second basic block comprising at least a second instruction, the second instruction comprising an operand; the plurality of instructions in the first basic block being annotated with basic block identifying information; the basic block identifying information identifying the first basic block; the first instruction in the first basic block being annotated with an instruction identifier indicating a relative position of the first instruction within the plurality of instructions in the first basic block; the first basic block having a maximum instruction identifier value for the first basic block, the maximum instruction identifier value comprising the highest relative position for the plurality of instructions in the first basic block; the operand of the second instruction being annotated with a relative basic block identifier, the relative basic block identifier identifying the first basic block by specifying the offset value; the operand of the second instruction being annotated with the instruction identifier;

verifying the second instruction by ensuring that the instruction identifier annotated to the operand of the second instruction does not exceed the maximum instruction identifier value;

verifying the second instruction by ensuring that the relative basic block identifier does not exceed the second domination level;

converting the intermediate code format representation into an executable format representation; and executing the executable format representation.

7. The computer program product of claim 6, wherein the intermediate code format representation is generated in static single assignment format.

8. The computer program product of claim 6, wherein the intermediate code format representation is generated in safe typed single assignment format.

9. The computer program product of claim 6, wherein reverse engineering of the intermediate code format representation is inhibited by incorporating a code optimization into the intermediate code format representation.

* * * * *

UNITED STATES PATENT AND TRADEMARK OFFICE
CERTIFICATE OF CORRECTION

| | |
|---|---|
| PATENT NO. | : 7,117,488 B1 |
| APPLICATION NO. | : 10/112002 |
| DATED | : October 3, 2006 |
| INVENTOR(S) | : Michael Franz et al. |

It is certified that error appears in the above-identified patent and that said Letters Patent is hereby corrected as shown below:

Title page:

Inventors: Please change "Jeffrey Von" Ronne to -- Jeffery von -- Ronne.

Page 2:

OTHER PUBLICATIONS, Column 1

Wolfram Amme, et al. reference entitled "SafeTSA:...", please change Jeffery von "Roone" to Jeffery von --Ronne--.

Page 2:

OTHER PUBLICATIONS, Column 1

Wolfram Amme, et al. reference, please change "Mobile-Ciode" to --Mobile-Code--.

Page 2:

OTHER PUBLICATIONS, Column 1

Wolfram Amme, et al. reference entitled "SafeTSA:...", please add after the word "Form", --in Procedings of the ACM Sigplan Conference on Programming Language Design and Implementation (PLDI 2001), Snowbird, Utah, pp. 137147; June 2001. --.

Page 2:

OTHER PUBLICATIONS, Column 2

Wolfram Amme, et al. reference, please add after "Vivek Haldar" -- Peter S. Housel, Jeffery von Ronne, Christian H. Stork, Sergiy Zhenochin --.

UNITED STATES PATENT AND TRADEMARK OFFICE
CERTIFICATE OF CORRECTION

PATENT NO. : 7,117,488 B1
APPLICATION NO. : 10/112002
DATED : October 3, 2006
INVENTOR(S) : Michael Franz et al.

It is certified that error appears in the above-identified patent and that said Letters Patent is hereby corrected as shown below:

<u>Page 2:</u>

OTHER PUBLICATIONS, Column 2

Wolfram Amme, et al. reference, please add after "Efficiency" -- in The Second DARPA Information Survivability Conference and Exhibition (DISCEX II), Anaheim, California; IEEE Computer Society Press, ISBN 0-7695-1212-7, pp. II.196-II.210; June 2001. --.

Signed and Sealed this

Twenty-seventh Day of March, 2007

JON W. DUDAS
*Director of the United States Patent and Trademark Office*